United States Patent Office 3,114,676
Patented Dec. 17, 1963

3,114,676
1'-($\Delta^{9(11)}$)-5$\beta$-ANDROSTENE-3$\alpha$-OL - 17$\beta$ - YL) - 3',5',8'-TRIOXA BICYCLO-(2,2,2)-OCTANE AND ITS CARBOXYLIC ACID ESTERS
Daniel Bertin, Montrouge, and Lucien Nedelec, Clichy-sous-Bois, France, assignors to Roussel-UCLAF, S.A., Paris, France, a corporation of France
No Drawing. Filed Oct. 30, 1962, Ser. No. 234,232
Claims priority, application France Nov. 3, 1961
14 Claims. (Cl. 167—65)

The invention relates to the novel androstene compounds having the formula

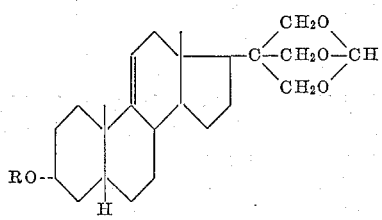

wherein R is selected from the group consisting of hydrogen and an acyl radical of an organic carboxylic acid having 1 to 7 carbon atoms. The invention also relates to a novel process for the preparation of the androstenes of Formula I and to novel intermediates thereof. The invention further relates to a novel method for the treatment of vascular and visceral spasms.

The compounds of Formula I possess a spasmolytic activity accompanied with a dilatory activity on coronary blood vessels and a peripheric vasodilatory activity and can be used for the treatment of spasms of coronary origin, spasms of the arterial or veinous system, of angina of the chest and of asthma and bronchial spasms.

It is an object of the invention to provide the novel products, 1'-[$\Delta^{9(11)}$-5$\beta$-androstene-3$\alpha$-ol-17$\beta$-yl] - 3',5',8'-trioxa bicyclo - [2,2,2] - octane and its carboxylic acid esters.

It is another object of the invention to provide a novel process for the preparation of the androstene compounds of Formula I.

It is a further object of the invention to provide novel intermediates for the compounds of Formula I.

It is an additional object of the invention to provide a novel method of treating vascular and visceral spasms.

It is another object of the invention to provide novel compositions for the treatment of vascular and visceral spasms.

These and other objects and advantages of the invention will become obvious from the following detailed description.

The novel compounds of the invention have the formula

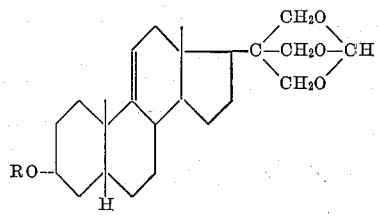

wherein R is selected from the group consisting of hydrogen and an acyl radical of an organic carboxylic acid having 1 to 7 carbon atoms.

Examples of suitable organic carboxylic acids having 1 to 7 carbon atoms to form the esters of Formula I are aliphatic acids such as acetic acid, propionic acid, trimethyl acetic acid, butyric acid, 4,4-dimethyl pentanoic acid, etc. and aromatic acids such as benzoic acid.

The process of the invention for the preparation of the compounds of Formula I comprises dehydrating a 3$\alpha$,21-diacyloxy-20-bis - (acyloxymethyl) - 5$\beta$ - pregnane-11$\beta$-ol wherein the acyl radical is derived from an organic carboxylic acid having 1 to 18 carbon atoms to form a 3$\alpha$,21 - diacyloxy - 20 - bis - (acyloxymethyl) - $\Delta^{9(11)}$-5$\beta$-pregnene, saponifying the latter under alkaline conditions to form 20-bis - (hydroxymethyl)-$\Delta^{9(11)}$-5$\beta$-pregnene-3$\alpha$, 21-diol, condensing the latter with a lower alkyl orthoformate to form 1'-($\Delta^{9(11)}$-5$\beta$-androstene-3$\alpha$-ol-17$\beta$-yl)-3',5',8'-trioxa bicyclo-(2,2,2)-octane which may be esterified with an organic carboxylic acid having 1 to 7 carbon atoms or a functional derivative thereof such as an acid halide or acid anhydride and recovering a compound of Formula I.

A preferred mode of the process of the invention for the preparation of compounds of Formula I comprises dehydrating 3$\alpha$,21-diacetoxy-20-bis - (acetoxymethyl)-5$\beta$-pregnane-11$\beta$-ol in the presence of a dehydrating agent such as perchloric acid in acetic acid or methane sulfonyl chloride and pyridine in dimethylformamide to form 3$\alpha$,21 - diacetoxy - 20 - bis - (acetoxymethyl) - $\Delta^{9(11)}$-5$\beta$-pregnene, saponifying the latter in the presence of a concentrated aqueous alkali metal hydroxide solution to form 20 - bis - (hydroxymethyl)-$\Delta^{9(11)}$-5$\beta$-pregnene-3$\alpha$,21-diol, condensing the latter with ethyl orthoformate in the presence of an acidic catalyst such as p-toluene sulfonic acid to form 1'-($\Delta^{9(11)}$-5$\beta$ - androstene - 3$\alpha$-ol-17$\beta$-yl)-3',5',8'-trioxa bicyclo-(2,2,2)-octane which may be acylated with an organic carboxylic acid having 1 to 7 carbon atoms or a functional derivative thereof and recovering a compound of Formula I. The reaction scheme is illustrated in Table I.

TABLE I

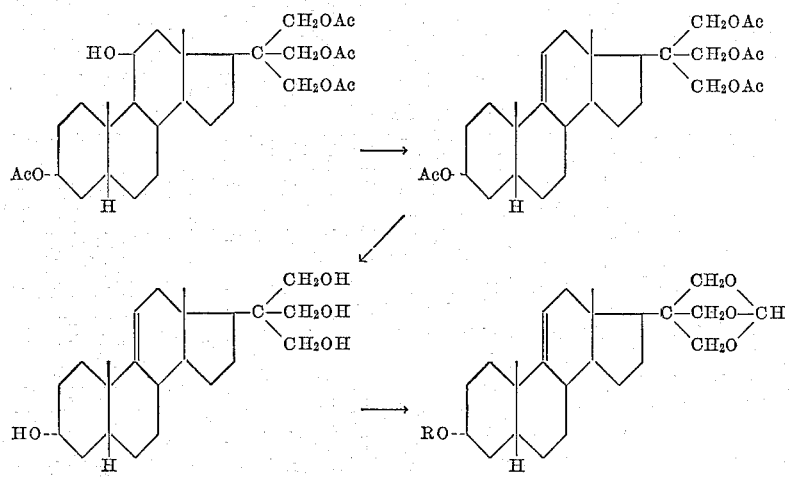

wherein R has the above definition and Ac is the acyl radical of an organic carboxylic acid having 1 to 18 carbon atoms.

The novel compositions of the invention for the treatment of spasms of vascular and visceral origin are comprised of a compound having the formula

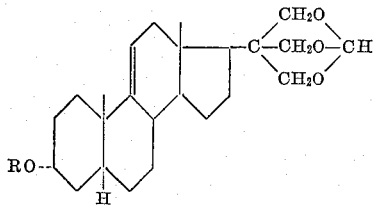

wherein R is selected from the group consisting of hydrogen and an acyl radical of an organic carboxylic acid having 1 to 7 carbon atoms and a pharmaceutical carrier. The compositions may be in the form of injectable solutions, injectable suspensions, prepared in ampules, in multiple dose flacons and in the form of tablets and suppositories prepared in the usual manner.

The novel method of the invention for the treatment of spasms of vascular and visceral origin comprises administering an effective amount of a compound having the formula

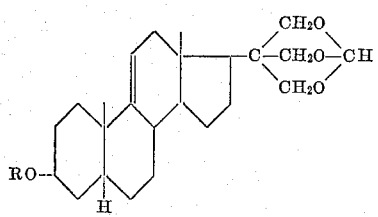

wherein R is selected from the group consisting of hydrogen and an acyl radical of an organic carboxylic acid having 1 to 7 carbon atoms. The said compounds may be administered orally, rectally or transcutaneously. The usual daily dose is 5 to 50 mgm. per day in the adult depending upon the method of administration.

The $3\alpha,21$-diacyloxy-20-bis - (acyloxymethyl)-$5\beta$-pregnane-$11\beta$-ols wherein the acyl radical is derived from an organic carboxylic acid having 1 to 18 carbon atoms used as starting materials for the process of the invention may be prepared by condensing $3\alpha$-acetoxy-$5\beta$-androstane-11,17-dione with ethyl cyanoacetate to form the ethyl ester of $3\alpha$-acetoxy-20-cyano-$\Delta^{17(20)}$-$5\beta$-pregnene-11-one-21-oic acid, catalytically hydrogenating the latter to form the ethyl ester of $3\alpha$-acetoxy - 20 - cyano-$5\beta$-pregnane-11-one-21-oic acid, simultaneously saponifying and hydrolyzing the latter under alkaline conditions to form 20-carboxy-$5\beta$-pregnane-$3\alpha$-ol-11-one-21-oic acid, esterifying the latter with methanol in the presence of hydrochloric acid to form the methyl ester of 20-carbomethoxy-$5\beta$-pregnane-$3\alpha$-ol-11-one-21-oic acid, reacting the latter with 2,3-dihydropyran to form the methyl ester of $3\alpha$-(2'-tetrahydropyranyloxy) - 20 - carbomethoxy - $5\beta$ - pregnane-11-one-21-oic acid, reacting the sodium derivative of the latter with benzyloxy chloromethane to form the methyl ester of $3\alpha$-(2'-tetrahydropyranyloxy) - 20 - carbomethoxy-20-benzyloxymethyl - $5\beta$ - pregnane-11-one-21-oic acid, hydrolyzing the latter under acidic conditions to form the methyl ester of 20-carbomethoxy-20-benzyloxymethyl-$5\beta$-pregnane-$3\alpha$-ol - 11 - one-21-oic acid, reducing the latter with lithium aluminum hydride to form 20-hydroxymethyl - 20-benzyloxymethyl-$5\beta$-pregnane-$3\alpha,11\beta,21$-triol, subjecting the latter to catalytic hydrogenolysis to form 20-bis-(hydroxymethyl)-$5\beta$-pregnane - $3\alpha,11\beta,21$-triol and esterifying the latter with an organic carboxylic acid having 1 to 18 carbon atoms or a functional derivative thereof to form $3\alpha,21$-diacyloxy-20-bis - (acyloxymethyl)-$5\beta$-pregnane-$11\beta$-ol.

The organic carboxylic acid having 1 to 18 carbon atoms may be aliphatic, aromatic or cycloaliphatic. Examples of suitable organic carboxylic acids are alkanoic and alkenoic acids such as acetic acid, trimethyl acetic acid, propionic acid, 4,4-dimethyl pentanoic acid, 10-undecanoic acid; cycloalkyl-alkanoic acids such as $\beta$-cyclopentyl propionic acid; aryl alkanoic acids such as phenyl propionic acid; cycloalkanoic acids such as hexahydrobenzoic acid and hexahydroterephthalic acid and phenyl carboxylic acids such as benzoic acid and 3,5-dinitrobenzoic acid.

In the following example there are described several preferred embodiments to illustrate the invention. However, it should be understood that the invention is not intended to be limited to the specific embodiments.

EXAMPLE I

*Preparation of $1'$-[$\Delta^{9(11)}$-$5\beta$ - Androstene - $3\alpha$-Ol-$17\beta$-Yl]-$3',5',8'$-Trioxa Bicyclo-[2,2,2]-Octane and its $3\alpha$-Acetate*

STEP A.—PREPARATION OF $3\alpha,21$-DIACETOXY-20-BIS-(ACETOXYMETHYL)-$\Delta^{9(11)}$-$5\beta$-PREGNENE 5.649 g. of $3\alpha,21$-diacetoxy 20-bis-(acetoxymethyl)-$5\beta$-pregnane-$11\beta$-ol were dissolved in 85 cc. of acetic acid. Then under agitation 1.7 cc. of 65% perchloric acid was added and the reaction mixture was allowed to stand for a period of about four hours in an atmosphere of nitrogen. Then the solution obtained was poured into 600 cc. of a mixture of water and ice and the aqueous solution was extracted several times with methylene chloride. The combined extracts were washed successively with water, with an aqueous solution containing 10% of sodium bicarbonate and with water, dried over magnesium sulfate and evaporated to dryness. Raw $3\alpha,21$-diacetoxy-20-bis-(acetoxymethyl)-$\Delta^{9(11)}$-$5\beta$-pregnene was obtained which was used as such for the next stage of the synthesis. However, it could be purified by chromatography through magnesium silicate with elution by methylene chloride containing 1% of methanol.

This compound, which is soluble in alcohol, ether, acetone, benzene and chloroform, is not described in the literature.

STEP B.—PREPARATION OF 20-BIS-(HYDROXYMETHYL)-$\Delta^{9(11)}$-$5\beta$-PREGNENE-$3\alpha,21$-DIOL 5.442 g. of the product prepared in Step A were dissolved in 54 cc. of ethanol. The solution was heated to reflux and over a period of several minutes 8.15 cc. of concentrated sodium hydroxide solution and 11 cc. of water were added. The reaction mixture was maintained at reflux temperature under agitation for a period of about 20 minutes and then 150 cc. of a mixture of water and ice were added. The precipitate formed was vacuum filtered, washed with water until the wash waters were neutral, and dried. The dried precipitate was triturated with dioxane and dried. 3.278 g. of 20-bis-(hydroxymethyl)-$\Delta^{9(11)}$-$5\beta$ - pregnene - $3\alpha,21$-diol having a melting point of 266° C. and a specific rotation $$[\alpha]_D^{20} = +16° \pm 3°$$

(c.=0.1% in ethanol) were obtained.

The product was very slightly soluble in acetone, alcohol and ether and insoluble in chloroform.

*Analysis.*—$C_{23}H_{38}O_4$: molecular weight=378.53. Calculated: C, 72.98%; H, 10.12%; O, 16.91%. Found: C, 73.2%; H, 10.0%; O, 17.3%.

This compound is not described in the literature.

STEP C.—PREPARATION OF $1'$-[$\Delta^{9(11)}$-$5\beta$-ANDROSTENE-$3\alpha$-OL-$17\beta$-YL]-$3',5',8'$-TRIOXA BICYCLO-[2,2,2]-OCTANE 3.25 gm. of 20-bis-(hydroxymethyl)-$\Delta^{9(11)}$-$5\beta$-pregnene-$3\alpha,21$-diol were suspended in a mixture of 4.4 cc. of dioxane and 65 mgm. of p-toluene sulfonic acid. The suspension was subjected to agitation and 1.40 cc. of ethyl orthoformate were added in one amount at a temperature of 37-38° C. Then in 30 minutes another 2.80 cc. of the same compound were added. After 2 hours of reaction, the reaction mixture was allowed to cool until room temperature, then successively 1 cc. of pyridine and 5 cc. of an aqueous solution containing 10% of sodium bicarbonate were added. The reaction mixture was diluted by slow addition of 50 cc. of water and agitated for a period of about one hour. The percipitate formed was vacuum filtered, washed successively with water, with 50% alcohol, with alcohol and with isopropyl ether and dried. 2.69 g. of 1'-($\Delta^{9(11)}$-5$\beta$-androstene-3$\alpha$-ol-17$\beta$-yl)-3',5',8'-trioxa bicyclo-(2,2,2)-octane were obtained, which was purified by recrystallization from ethanol. The product had a melting point of 255° C.

This compound is a crystallized colorless product soluble in chloroform, slightly soluble in alcohol and ether.

It is not described in the literature.

84 mgm. of 1'-($\Delta^{9(11)}$-5$\beta$-androstene-3$\alpha$-ol-17$\beta$-yl)-3',5',8'-trioxa bicyclo-(2,2,2)-octane were placed in suspension at room temperature in 0.8 cc. of pyridine and 0.4 cc. of acetic acid anhydride. The reaction mixture was heated to about 40° C. in order to obtain dissolution. The mixture was then agitated for a period of about one hour and a half and then the solution obtained was allowed to stand at 22-24° C. for a period of about two hours and 15 minutes. Next, a mixture of water and ice was added and the crystalline precipitate which appeared was vacuum filtered, washed with water and dried. 90 mgm. of 1'-(3$\alpha$-acetoxy-$\Delta^{9(11)}$-5$\beta$-androstene-17$\beta$-yl)-3',5',8'-trioxa bicyclo-(2,2,2)-octane having a melting point of 232° C. were obtained.

This compound was a crystallized colorless product, and was very soluble in chloroform, slightly soluble in alcohol, ether and acetone.

This compound is not described in the literature.

PHARMACOLOGICAL STUDY OF 1'-[3$\alpha$-ACETOXY-$\Delta^{9(11)}$ - 5$\beta$ - ANDROSTENE-17$\beta$ - yl] - 3',5',8' - TRIOXA BICYCLO-2,2,2-OCTANE I. *Action on the Coronary Blood Flow*

The study of the action of this compound on coronary blood flow was made on the isolated rabbit heart using a technique inspired by Langendorff (Arch. gesam. Physiol., 1895, 61, 291). In this method, the heart was suspended by the aorta to a canula and the coronary system was perfused, by means of this canula, under a constant pressure of 5 cm. of mercury, with Locke serum, at a pH of 7.2 to 7.3, heated to 37° C.

The compound studied was placed in solution in ethanol and this solution was diluted with Locke serum to a convenient concentration. A 3-way stop cock permited instantaneous changing from normal Locke serum to the serum containing the product to be studied. On a proper apparatus the coronary blood flow and the ventricularly contractions were registered.

The least-concentration of this compound which clearly augments the coronary blood flow of such a preparation was systematically searched and the results obtained with this compound and with papaverine hydrochloride are shown in Table II. It is to be noted that under the same experimental conditions the minimal active concentration of papaverine hydrochloride was 10 $\gamma$/cc. whereas the compound of the invention had a minimal active concentration situated between 0.01 and 0.05 $\gamma$/cc.

TABLE II

| Compound Studied | Minimal Active Concentration in $\mu$g./cc. in perfusion liquid | Increase of Coronary Blood Flow in percent of Normal Blood Flow |
|---|---|---|
| Papaverine Hydrochloride | 10 | 20 |
| 1'-[3$\alpha$-acetoxy-$\Delta^{9(11)}$-5$\beta$-androstene-17$\beta$-yl]-3', 5', 8'-trioxa bicyclo (2,2,2)-octane | 0.01-0.05 | 20-50 |

At a concentration of 1 $\gamma$/cc. a 20% diminution of the frequency of cardiac beats was noted and a positive clear inotropic effect was also noted. The augmentation of the coronary blood flow attained (expressed as a percentage of the initial blood flow) was thus 120%.

II. *Determination of Spasmolytic Effect on the Contracture of the Isolated Intestine of Guinea Pigs*

A fragment of the ileum of a guinea pig was suspended in an isolated organ tube of 10 cc. containing constantly oxygenated Tyrode liquid maintained at 37° C. The contractures of the intestine were provoked by the addition of barium chloride, acetyl choline or histamine to the Tyrode liquid. The 1'-[$\Delta^{9(11)}$-5$\beta$-androstene-3$\alpha$-ol-17$\beta$-yl]-3',5',8'-trioxa bicyclo-[2,2,2]-octane (A) or the 1'-[3$\alpha$ - acetoxy - $\Delta^{9(11)}$ - 5$\beta$ - androstene - 17$\beta$ - yl] - 3',5',8'-trioxa bicyclo-[2,2,2]-octane (B) were added to the bath at the maximum of the contracture and the minimal concentration of the compound which provoked the decontraction of the organ was determined. The minimal concentration of the compounds A and B which inhibited the action of a new dose of contracturing agent was also determined. For comparison, the same tests were conducted with papaverine hydrochloride. The results obtained are shown in Table III attached.

TABLE III.—CONCENTRATIONS OF THE COMPOUND STUDIED EXPRESSED IN $\gamma$/CC. OF THE BATH NECESSARY IN ORDER TO PRODUCE DECONTRACTION OF THE CONTRACTED ORGAN (D) AND INHIBITION OF THE ACTION OF THE CONTRACTURING AGENT (I)

| Compounds Studied | Guinea Pig Intestine Tyrode + Cl$^2$Ba | | Guinea Pig Intestine Tyrode + acetylcholine | | Guinea Pig Intestine Tyrode + histamine | |
|---|---|---|---|---|---|---|
| | D | I | D | I | D | I |
| Papaverine Hydrochloride | 20 | 30 | 15 | 20 | 10-15 | 15 |
| Compound A | 15 | 25 | 5 | 10 | 5 | 10 |
| Compound B | 20 | 20 | | >20 | 10 | >10 |

III. *Determination of Spasmolytic Effect on Isolated Biliary Vesicule of Guinea Pigs*

This test was made under the conditions described by Chiray et al. (Revue du Foie, 1943, 2nd series) and by utilizing the vesicule of a guinea pig kept fasting for 24 hours. The contracture was provoked by the addition of barium chloride. 1'-[$\Delta^{9(11)}$-5$\beta$-androstene-3$\alpha$-ol-17$\beta$-yl]-3',5',8'-trioxa bicyclo-[2,2,2]-octane (A) used at a concentration of 10-15 $\gamma$/cc. inhibited the action of this contracturing agent.

Various modifications of the process and composition of the invention may be made without departing from the spirit or scope thereof and it is to be understood that the invention is to be limited only as defined in the appended claims.

We claim:

1. Compounds having the formula

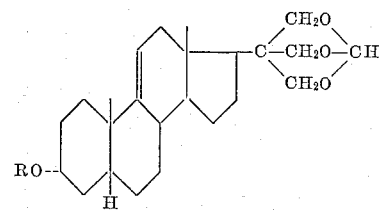

wherein R is selected from the group consisting of hydrogen and an acyl radical of an organic carboxylic acid having 1 to 7 carbon atoms.

2. 1' - ($\Delta^{9(11)}$ - 5$\beta$ - androstene - 3$\alpha$ - ol - 17$\beta$ - yl) - 3',5',8'-trioxa bicyclo-(2,2,2)-octane.

3. 1' - (3$\alpha$ - acetoxy - $\Delta^{9(11)}$ - 5$\beta$ - androstene - 17$\beta$ - yl)-3',5',8'-trioxa bicyclo-(2,2,2)-octane.

4. Compounds having the formula

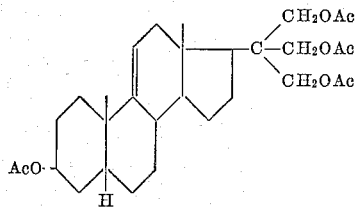

wherein Ac is an acyl radical of an organic carboxylic acid having 1 to 18 carbon atoms.

5. 3α,21 - diacetoxy - 20 - bis - (acetoxymethyl) - $\Delta^{9(11)}$-5β-pregnene.

6. 20 - bis - (hydroxymethyl) - $\Delta^{9(11)}$ - 5β - pregnene - 3α,21-diol.

7. A process for the preparation of compounds having the formula

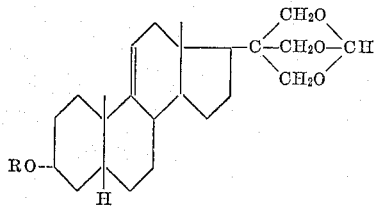

wherein R is selected from the group consisting of hydrogen and an acyl radical of an organic carboxylic acid having 1 to 7 carbon atoms which comprises dehydrating a 3α,21 - diacyloxy - 20 - bis - (acyloxymethyl) - 5β-pregnane-11β-ol with a dehydrating agent to form a 3α, 21 - diacyloxy - 20 - bis - (acyloxymethyl) - $\Delta^{9(11)}$ - 5β - pregnene wherein the acyl radical is derived from an organic carboxylic acid having 1 to 18 carbon atoms, saponifying the latter under alkaline conditions to form 20 - bis - (hydroxymethyl) - $\Delta^{9(11)}$ - 5β - pregnene - 3α, 21-diol, condensing the latter with a lower alkyl orthoformate in the presence of an acidic condensation catalyst to form 1'-($\Delta^{9(11)}$-5β-androstene-3α-ol-17β-yl)-3',5', 8'-trioxa bicyclo-(2,2,2)-octane and recovering a compound of the above formula.

8. The process of claim 7 wherein the dehydrating agent is selected from the group consisting of perchloric acid in acetic acid and methane sulfonyl chloride and pyridine in dimethylformamide.

9. The process of claim 7 wherein the lower alkyl orthoformate is ethyl orthoformate.

10. A process for the preparation of 1'-[$\Delta^{9(11)}$-5β-androstene - 3α-ol-17β-yl]-3',5',8'-trioxa bicyclo-(2,2,2)-octane which comprises dehydrating 3α,21-diacetoxy-20-bis-(acetoxymethyl)-5β-pregnane-11β-ol with a dehydrating agent to form 3α,21 - diacetoxy-20-bis-(acetoxymethyl)-$\Delta^{9(11)}$-5β-pregnene, saponifying the latter with an aqueous sodium hydroxide solution to form 20-bis-(hydroxymethyl) - $\Delta^{9(11)}$-5β-pregnene-3α,21-diol, condensing the latter with ethyl orthoforfate in the presence of p-toluene sulfonic acid to form 1'-($\Delta^{9(11)}$-5β-androstene-3α-ol-17β-yl)-3',5',8'-trioxa bicyclo-(2,2,2)-octane and recovering the latter.

11. A process for the preparation of 1'-(3α-acetoxy-$\Delta^{9(11)}$ - 5β-androstene-17β-yl)-3',5',8'-trioxa bicyclo-(2,2, 2)-octane which comprises dehydrating 3α,21-diacetoxy-20-bis-(acetoxymethyl)-5β-pregnane-11β-ol with a dehydrating agent to form 3α,21-diacetoxy-20-bis-(acetoxymethyl)-$\Delta^{9(11)}$-5β-pregnene, saponifying the latter with an aqueous sodium hydroxide solution to form 20-bis-(hydroxymethyl) - $\Delta^{9(11)}$-5β-pregnene-3α,21-diol, condensing the latter with ethyl orthoformate in the presence of p-toluene sulfonic acid to form 1' - ($\Delta^{9(11)}$-5β-androstene-3α - ol - 17β - yl) - 3',5',8' - trioxa bicyclo-(2,2,2)-octane, esterifying the latter with acetic acid anhydride to form 1' - (3α - acetoxy - $\Delta^{9(11)}$ - 5β - androstene - 17β - yl) - 3', 5',8'-trioxa bicyclo-(2,2,2)-octane and recovering the latter.

12. A composition for the treatment of spasms of vascular and visceral origin comprising 5 to 50 mgn. of an androstene compound having the formula

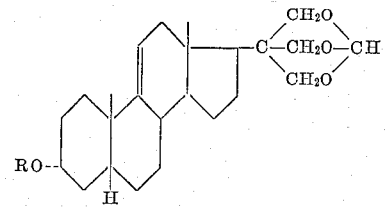

wherein R is selected from the group consisting of hydrogen and an acyl radical of an organic carboxylic acid having 1 to 7 carbon atoms and a pharmaceutical carrier.

13. A composition of claim 12 wherein the androstene compound is 1'-($\Delta^{9(11)}$-5β-androstene-3α-ol-17β-yl)-3',5',8'-trioxa bicyclo-(2,2,2)-octane.

14. A composition of claim 12 wherein the androstene compound is 1'-(3α-acetoxy-$\Delta^{9(11)}$-5β-androstene-17β-yl)-3',5',8'-trioxa bicyclo-(2,2,2)-octane.

No references cited.